United States Patent
Kawada et al.

(10) Patent No.: US 9,249,300 B2
(45) Date of Patent: Feb. 2, 2016

(54) RESIN COMPOSITION

(71) Applicants: KABUSHIKI KAISHA TOYOTA CHUO KENKYUSHO, Nagakute-shi, Aichi (JP); TOYOTA BOSHOKU KABUSHIKI KAISHA, Kariya-shi, Aichi (JP)

(72) Inventors: Jumpei Kawada, Nisshin (JP); Makoto Mouri, Seto (JP); Osamu Watanabe, Nagoya (JP); Arimitsu Usuki, Nagoya (JP); Masayuki Kito, Kariya (JP); Akio Amari, Kariya (JP); Osamu Kito, Kariya (JP)

(73) Assignees: KABUSHIKI KAISHA TOYOTA CHUO KENKYUSHO, Toyota (JP); TOYOTA BOSHOKU KABUSHIKI KAISHA, Kariya (JP)

( * ) Notice: Subject to any disclaimer, the term of this patent is extended or adjusted under 35 U.S.C. 154(b) by 0 days.

(21) Appl. No.: 14/410,425

(22) PCT Filed: Jun. 21, 2013

(86) PCT No.: PCT/JP2013/067751
§ 371 (c)(1),
(2) Date: Dec. 22, 2014

(87) PCT Pub. No.: WO2013/191307
PCT Pub. Date: Dec. 27, 2013

(65) Prior Publication Data
US 2015/0218373 A1    Aug. 6, 2015

(30) Foreign Application Priority Data

Jun. 22, 2012   (JP) .................. 2012-140568
Jun. 20, 2013   (JP) .................. 2013-129675

(51) Int. Cl.
| | |
|---|---|
| C08L 77/00 | (2006.01) |
| C08L 23/00 | (2006.01) |
| C08L 51/00 | (2006.01) |
| C08L 77/02 | (2006.01) |
| C08L 101/00 | (2006.01) |
| C08L 23/12 | (2006.01) |
| C08L 23/26 | (2006.01) |
| C08L 51/06 | (2006.01) |
| C08L 23/02 | (2006.01) |

(52) U.S. Cl.
CPC ............. *C08L 77/02* (2013.01); *C08L 23/00* (2013.01); *C08L 23/12* (2013.01); *C08L 23/26* (2013.01); *C08L 77/00* (2013.01); *C08L 101/00* (2013.01); *C08L 23/02* (2013.01); *C08L 51/06* (2013.01); *C08L 2205/03* (2013.01); *C08L 2205/04* (2013.01); *C08L 2205/05* (2013.01); *C08L 2205/08* (2013.01); *C08L 2205/22* (2013.01)

(58) Field of Classification Search
None
See application file for complete search history.

(56) References Cited

U.S. PATENT DOCUMENTS

| | | | | |
|---|---|---|---|---|
| 6,117,561 A | * | 9/2000 | Jacquemet et al. | ........ 428/475.5 |
| 2006/0122326 A1 | * | 6/2006 | Okamoto et al. | ............... 525/66 |

FOREIGN PATENT DOCUMENTS

| | | |
|---|---|---|
| EP | 1 672 030 A2 | 6/2006 |
| JP | A-7-97513 | 4/1995 |
| JP | A-7-316423 | 12/1995 |
| JP | A-9-59438 | 3/1997 |
| JP | A-2000-327912 | 11/2000 |
| JP | A-2001-302910 | 10/2001 |
| JP | 2003128057 A | 5/2003 |
| JP | A-2006-307132 | 11/2006 |
| JP | A-2010-195853 | 9/2010 |
| WO | WO 2011/069302 A1 | 6/2011 |

OTHER PUBLICATIONS

Holsti-Miettinen, et al., "Functionalized Elastomeric Compatibilizer in PA 6/PP Blends and Binary Interactions Between Compatibilizer and Polymer," *Polymer Engineering and Science*, vol. 34 No. 5, Mar. 1994, pp. 395-404.

Gonzalez-Montiel, A., et al., "Morphology of Nylon 6/Polypropylene Blends Compatibilized with Maleated Polypropylene," *Journal of Polymer Science, Part B: Polymer Physics*, vol. 33, No. 12, Sep. 15, 1995, pp. 1751-1767.

International Search Report issued in International Patent Application No. PCT/JP2013/067751 dated Aug. 10, 2013.

International Written Opinion issued in International Patent Application No. PCT/JP2013/067751 dated Aug. 10, 2013.

Dec. 12, 2014 Office Action issued in Japanese Application No. 2013-129675.

* cited by examiner

*Primary Examiner* — Ana Woodward
(74) *Attorney, Agent, or Firm* — Oliff PLC

(57) ABSTRACT

A resin composition has a first resin, a second resin incompatible with the first, and a modified elastomer having a reactive group capable of reacting with the first resin. The resin composition has a co-continuous phase structure including continuous phases A and B respectively formed of the first and second resins, dispersed domains a and b respectively distributed in the continuous phases A and B, and finely dispersed subdomains a' and b' respectively distributed in the dispersed domains a and b. The dispersed domain a includes a dispersed domain formed of at least one of the second resin and a first resin, modified elastomer reaction product, the dispersed domain b at least one of the first resin and the reaction product, and the finely dispersed subdomains a' and b' each independently at least one of the first resin, the second resin, the modified elastomer, and the reaction product.

7 Claims, 5 Drawing Sheets

RESIN COMPOSITION

TECHNICAL FIELD

The present invention relates to a resin composition.

BACKGROUND ART

Heretofore, for the purpose of improving physical properties of resins, polymer blends and polymer alloys have been actively studied, which are mixtures of resins having different characteristics from each other so as to modify properties of resins. However, among such polymer blends and polymer alloys, when resins having different polarities from each other, for example, a polyolefin such as polypropylene (PP) and a polyamide (PA), are combined together, the poor compatibility between the resins brings about a problem that the resulting composite material has significantly low impact strength.

For this reason, in order to improve the compatibility between polyolefins and polyamides, methods have been proposed, in which a compatibilizer such as a modified polyolefin is used. For example, Japanese Unexamined Patent Application Publication Nos. 2000-327912 (PTL 1) and 2001-302910 (PTL 2) describe a thermoplastic resin composition including a polyamide resin and a modified polyolefin, in which a phase-separated structure has a matrix phase formed of the polyolefin and a dispersed domain formed of the polyamide resin.

Moreover, Japanese Unexamined Patent Application Publication No. Hei 7-97513 (PTL 3) describes a polyamide resin composition including a polyamide resin prepolymer having a relative viscosity within a specific range and modified polypropylene. Japanese Unexamined Patent Application Publication Nos. Hei 7-316423 (PTL 4) and Hei 9-59438 (PTL 5) describe a polyamide resin composition including a polyamide, a modified polyolefin, and an unmodified polyolefin, in which the polyamide forms a matrix phase, and the modified polyolefin and the unmodified polyolefin form a dispersed domain having a core-shell particle structure.

Further, Japanese Unexamined Patent Application Publication No. 2006-307132 (PTL 6) describes a thermoplastic resin composition, in which a dispersed domain having a core-shell particle structure formed of an acid modified elastomer serving as a shell phase and an olefin-based resin component and a filler component serving as a core phase is distributed in a matrix phase formed of a polyamide resin component. Furthermore, Japanese Unexamined Patent Application Publication No. 2010-195853 (PTL 7) describes a thermoplastic resin composition having: a continuous phase (matrix phase) formed of a thermoplastic resin such as a polyamide resin or a polypropylene; a dispersed domain formed of a resin having a reactive functional group; and particulates formed of a reaction product of the thermoplastic resin and the resin having a reactive functional group. However, no conventional polymer blends and polymer alloys have been obtained yet as a resin composition having sufficient physical properties.

Meanwhile, in the fields of automotive interior and exterior components and the like, particularly high mechanical properties are required, and it is essential to satisfy both impact strength and rigidity (flexural modulus). Nevertheless, rigidity and impact strength are conflicting properties. Furthermore, the physical properties of an obtained resin composite tend to be dominated by the physical properties of one of the resins thus combined. Hence, conventional polymer blends and polymer alloys have a problem that it is difficult to satisfy both rigidity and impact strength.

CITATION LIST

Patent Literature

[PTL 1] Japanese Unexamined Patent Application Publication No. 2000-327912
[PTL 2] Japanese Unexamined Patent Application Publication No. 2001-302910
[PTL 3] Japanese Unexamined Patent Application Publication No. Hei 7-97513
[PTL 4] Japanese Unexamined Patent Application Publication No. Hei 7-316423
[PTL 5] Japanese Unexamined Patent Application Publication No. Hei 9-59438
[PTL 6] Japanese Unexamined Patent Application Publication No. 2006-307132
[PTL 7] Japanese Unexamined Patent Application Publication No. 2010-195853

SUMMARY OF INVENTION

Technical Problem

The present invention has been made in consideration of the above-described problems in the conventional techniques. An object of the present invention is to provide a resin composition having excellent impact strength and also having excellent rigidity.

Solution to Problem

The present inventors have earnestly studied in order to achieve the above object. As a result, the inventors have found out the followings. Specifically, when a first resin and a second resin incompatible with each other are to be combined together, if the first resin was first allowed to react with a modified elastomer in a particular ratio in advance and then the first resin reacted with the modified elastomer was combined with the second resin, a resin composition having a unique structure is obtained. Specifically, the resin composition has a co-continuous phase structure including a continuous phase A formed of the first resin and a continuous phase B formed of the second resin, and also has a dispersed domain a formed of a particular component distributed in the continuous phase A, a finely dispersed subdomain a' formed of a particular component distributed in the dispersed domain a, a dispersed domain b formed of a particular component distributed in the continuous phase B, and a finely dispersed subdomain b' formed of a particular component distributed in the dispersed domain b. Furthermore, surprisingly, it has been found out that the resin composition having such a structure has excellent rigidity and has significantly excellent impact strength.

Specifically, the resin composition of the present invention is a resin composition comprising a blend of a first resin, a second resin incompatible with the first resin, and a modified elastomer having a reactive group capable of reacting with the first resin, wherein the resin composition has a co-continuous phase structure including a continuous phase A formed of the first resin and a continuous phase B formed of the second resin, and also has a dispersed domain a distributed in the continuous phase A, a finely dispersed subdomain a' distributed in the dispersed domain a, a dispersed domain b distributed in the continuous phase B, and a finely dispersed subdomain b' distributed in the dispersed domain b, the dispersed domain a includes a dispersed domain formed of at least one selected from the group consisting of the second resin and a reaction product of the first resin and the modified elastomer, the dispersed domain b includes a dispersed domain formed of at least one selected from the group consisting of the first resin and the reaction product of the first resin and the modified elastomer, when the dispersed domain a is formed of the second resin, the finely dispersed subdomain a' is a finely dispersed subdomain formed of at least one selected from the group consisting of the first resin, the modified elastomer, and the reaction product of the first resin and the modified elastomer, when the dispersed domain a is formed of the reaction product of the first resin and the modified elastomer, the finely dispersed subdomain a' is a finely dispersed subdomain formed of at least one selected from the group consisting of the first resin, the second resin, and the modified elastomer, when the dispersed domain b is formed of the first resin, the finely dispersed subdomain b' is a finely dispersed subdomain formed of at least one selected from the group consisting of the second resin, the modified elastomer, and the reaction product of the first resin and the modified elastomer, and when the dispersed domain b is formed of the reaction product of the first resin and the modified elastomer, the finely dispersed subdomain b' is a finely dispersed subdomain formed of at least one selected from the group consisting of the first resin, the second resin, and the modified elastomer.

In the resin composition of the present invention, the first resin is preferably a polyamide resin. Moreover, in the resin composition of the present invention, the second resin is preferably a polyolefin resin.

Further preferably, in the resin composition of the present invention, the dispersed domain a includes a dispersed domain formed of the second resin and a dispersed domain formed of the reaction product of the first resin and the modified elastomer, the dispersed domain b includes a dispersed domain formed of the reaction product of the first resin and the modified elastomer, the finely dispersed subdomain a' in the dispersed domain a formed of the second resin is a finely dispersed subdomain formed of the reaction product of the first resin and the modified elastomer, and the finely dispersed subdomain b' in the dispersed domain b formed of the reaction product of the first resin and the modified elastomer is a finely dispersed subdomain formed of the modified elastomer.

Additionally, the resin composition of the present invention preferably further has a dispersed domain formed of the modified elastomer in at least one continuous phase selected from the group consisting of the continuous phase A and the continuous phase B, and more preferably further has a finely dispersed subdomain in the dispersed domain formed of the modified elastomer, the finely dispersed subdomain formed of at least one selected from the group consisting of the first resin, the second resin, and the reaction product of the first resin and the modified elastomer.

Advantageous Effects of Invention

The present invention makes it possible to provide a resin composition having excellent impact strength and also having excellent rigidity.

DESCRIPTION OF EMBODIMENTS

Figure 1:
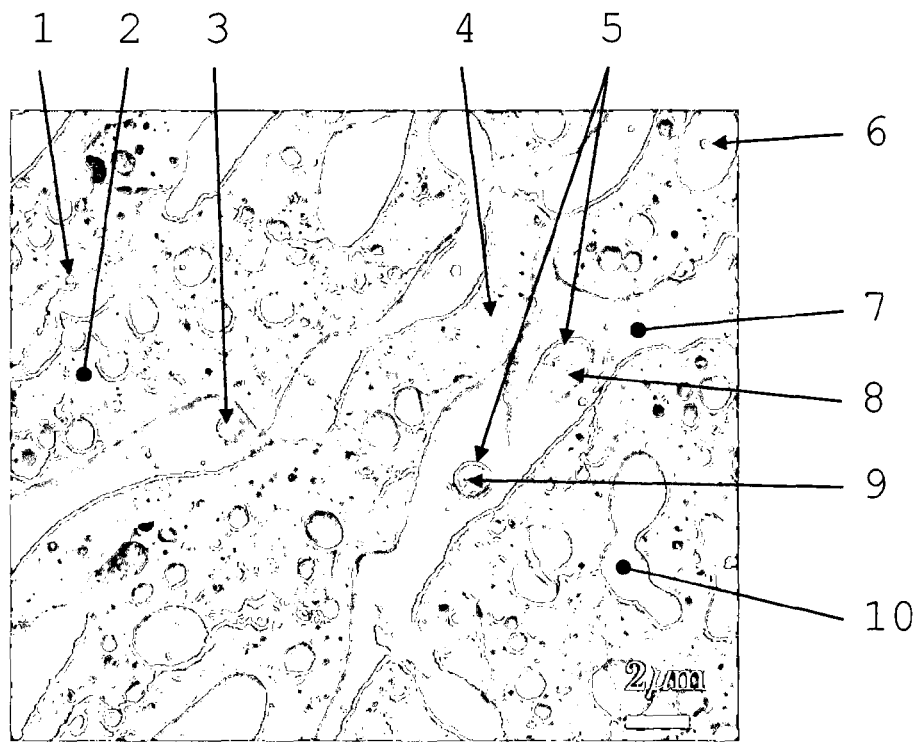
FIG. 1 is a field-emission scanning electron microscope (FE-SEM) photograph of an Example 1 test specimen for physical property measurements.

Hereinafter, the present invention will be described in details on the basis of preferred embodiments thereof.

A resin composition of the present invention is a resin composition comprising a blend of a first resin, a second resin incompatible with the first resin, and a modified elastomer having a reactive group capable of reacting with the first resin.

<First Resin>

The first resin according to the present invention is a resin for forming a continuous phase A in the resin composition of the present invention. In the present invention, such a first resin needs to be a resin incompatible with the second resin according to the present invention from the viewpoints of forming a co-continuous phase together with a continuous phase B formed of the second resin according to the present invention, and demonstrating excellent rigidity and impact strength. Moreover, from the viewpoint of having a tendency to be easily mixed in a molten state, the first resin is preferably a thermoplastic resin.

Examples of such a first resin include a polyamide resin, a PPS resin, a PPE resin, a PS resin, a PC resin, an ABS resin, an AES resin, a PET resin, a PBT resin, a PTT resin, a PLA resin, a PHB resin, a P(HB-co-HV) resin, and a P(HB-co-HH$_x$) resin. One of these may be used alone, or two or more of these may be used in combination. Above all, a polyamide resin is preferable from the viewpoint of demonstrating more excellent impact strength when a polyolefin resin is used as the second resin according to the present invention.

The polyamide resin is a polymer having a chain backbone composed of multiple monomers polymerized via an amide linkage (—NH—CO—). Examples of the monomer constituting the polyamide resin include amino acids such as aminocaproic acid, 11-aminoundecanoic acid, aminododecanoic acid, and para-aminomethylbenzoic acid; lactams such as ε-caprolactam, undecanelactam, and ω-lauryl lactam; and the like. One of these monomers may be used alone, or two or more of these may be used in combination.

Meanwhile, the polyamide resin can be obtained by copolymerizing a diamine and a dicarboxylic acid. Examples of the diamine as the monomer include: aliphatic diamines such as ethylenediamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl-1,8-diaminooctane; alicyclic diamines such as cyclohexanediamine, and bis-(4-aminocyclohexhexyl)methane; and aromatic diamines such as xylylenediamine, p-phenylenediamine, and m-phenylenediamine. One of these diamines may be used alone, or two or more of these may be used in combination.

Examples of the dicarboxylic acid as the monomer include aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brassylic acid, tetradecanedioic acid, pentadecanedioic acid, and octadecanedioic acid; alicyclic dicarboxylic acids such as cyclohexanedicarboxylic acid; and aromatic dicarboxylic acids such as phthalic acid, terephthalic acid, isophthalic acid, and naphthalenedicarboxylic acid. One of these dicarboxylic acids may be used alone, or two or more of these may be used in combination.

Examples of such a polyamide resin include polyamide resins using a monomer having 11 carbon atoms (hereinafter, in some cases, such a polyamide resin is collectively referred to as "PA11 (polyamide 11)-based resin"), polyamide 6 (PA6), polyamide 66 (PA66), polyamide 610, polyamide 612, polyamide 12, polyamide 6T (PA6T), polyamide 6I, polyamide 9T, polyamide MST, polyamide 1010, polyamide 1012, polyamide 10T, polyamide MXD6, polyamide 1012, polyamide 6T/66, polyamide 6T/6I, polyamide 6T/6I/66, polyamide 6T/2M-5T, polyamide 9T/2M-8T, and the like. One of these may be used alone, or two or more of these may be used in combination.

Among the aforementioned polyamide resins, a PA11-based resin, PA6, PA66, and PA6T are preferable in the present invention from the viewpoint of having a tendency to demonstrate more excellent impact strength when a polyolefin resin is used as the second resin according to the present invention.

The PA11-based resin is a polyamide resin obtained by using a monomer having 11 carbon atoms as the aforementioned monomer, and contains in the main chain an amide linkage-containing unit having 11 carbon atoms. As the monomer having 11 carbon atoms, 11-aminoundecanoic acid or undecanelactam is preferable. Particularly, polyamide 11 (PA11) obtained as a homopolymer by polymerizing 11-aminoundecanoic acid as the monomer is desirable from the viewpoint of environmental protection (particularly, from the viewpoint of carbon neutral) because the 11-aminoundecanoic acid is a compound obtained from caster oil.

Meanwhile, the PA11-based resin may contain any of a constitutional unit derived from a monomer having less than 11 carbon atoms, a constitutional unit derived from a monomer having 12 or more carbon atoms, and other constitutional units alone or in combination of two or more of these. Nevertheless, the content of the constitutional unit derived from the monomer having 11 carbon atoms is preferably 50% by mol or more, more preferably 100% by mol, based on all the constitutional units in the PA11-based resin.

The PA6 is a polyamide resin obtained as a homopolymer by polymerizing ε-caprolactam among monomers having 6 carbon atoms. The PA66 is a polyamide resin obtained by copolymerizing hexamethylenediamine and adipic acid. The polyamide 6T is a polyamide resin obtained by copolymerizing hexamethylenediamine and terephthalic acid.

The first resin according to the present invention preferably contains 40% by mass of the PA11-based resin, the PA6, the PA66, and the PA6T in total based on the total amount of the first resin, from the viewpoint of demonstrating more excellent impact strength when a polyolefin resin is used as the second resin according to the present invention.

Additionally, the weight average molecular weight (in terms of polystyrene standards) of the first resin according to the present invent ion measured by gel permeation chromatography (GPC) is not particularly limited, but is preferably 5,000 to 100,000, more preferably 7,500 to 70,000, and further preferably 10,000 to 50,000.

<Second Resin>

The second resin according to the present invention is a resin for forming the continuous phase B in the resin composition of the present invention. In the present invention, such a second resin needs to be a resin incompatible with the first resin according to the present invention from the viewpoint of forming the co-continuous phase together with the continuous phase A formed of the first resin according to the present invention, and demonstrating excellent rigidity and impact strength. Moreover, from the viewpoint of having a tendency to be easily mixed in a molten state, the second resin is preferably a thermoplastic resin. Such a second resin is preferably a polyolefin resin from the viewpoint of demonstrating more excellent impact strength when the polyamide resin is used as the first resin according to the present invention.

The polyolefin resin is not particularly limited, and various polyolefins can be used. Examples thereof include an ethylene homopolymer (polyethylene resin), a propylene homopolymer (polypropylene resin), an ethylene-propylene copolymer, an ethylene-α-olefin copolymer, a propylene-α-olefin copolymer, and the like. The α-olefin is normally an unsaturated hydrocarbon compound having 3 to 20 carbon atoms. Examples thereof include propylene, 1-butene, 1-pentene, 1-hexene, 1-heptene, 3-methyl-1-butene, 4-methyl-1-pentene, and the like.

One of such polyolefin resins may be used alone, or two or more of these may be used in combination. Above all, from the viewpoint of having a tendency to further improve the rigidity of the resin composition, a polypropylene resin and a polyethylene resin are preferable, and a polypropylene resin is more preferable. Moreover, in such a polypropylene resin and a polyethylene resin, the content of a constitutional unit derived from propylene or ethylene is preferably 50% by mol or more based on all the constitutional units in the polypropylene resin or the polyethylene resin. If the content is less than the lower limit, there is a tendency that the rigidity of the resin composition is lowered.

The weight average molecular weight (in terms of polystyrene standards, temperature: 140 to 150° C.) of the second resin according to the present invention measured by gel permeation chromatography (GPC) is not particularly limited, but is preferably 10,000 to 500,000, more preferably 50,000 to 450,000, and further preferably 100,000 to 400,000.

Note that the second resin according to the present invention is different from the modified elastomer described below in that the second resin is not compatible with the continuous phase A formed of the first resin according to the present invention, and that the second resin has no reactive group capable of reacting with the first resin.

<Modified Elastomer>

The modified elastomer according to the present invention is a modified elastomer having a reactive group capable of reacting with the first resin, and functions as a compatibilizer that makes the first resin and the second resin compatible with each other. The elastomer is preferably a thermoplastic elastomer, and more preferably an olefin-based thermoplastic elastomer and a styrene-based thermoplastic elastomer, from the viewpoints of being highly reactive, and more easily making the resins compatible with each other when a polyolefin resin is used as the second resin according to the present invention.

Examples of the olefin-based thermoplastic elastomer include ones obtained by copolymerizing two or more of α-olefins such as ethylene, propylene, 1-butene, 1-pentene, and 1-octene. One of these may be used alone, or two or more of these may be used in combination. Above all, the olefin-based thermoplastic elastomer is preferably copolymers of ethylene or propylene and α-olefins having 3 to 8 carbon atoms, that is, a copolymer of ethylene and an α-olefin having 3 to 8 carbon atoms and a copolymer of propylene and an α-olefin having 4 to 8 carbon atoms, from the viewpoint of having a tendency to further improve the rigidity and the impact strength of the resin composition. Specific examples of such an olefin-based thermoplastic elastomer include an ethylene-propylene copolymer (EPR), an ethylene-1-butene copolymer (EBR), an ethylene-1-pentene copolymer, an ethylene-1-octene copolymer (EOR), a propylene-1-butene copolymer (PBR), a propylene-1-pentene copolymer, and a propylene-1-octene copolymer (POR). Among these, EBR, EOR, and PBR are further preferable from the viewpoint of having a tendency to further improve the rigidity and the impact strength of the resin composition.

Examples of the styrene-based thermoplastic elastomer include block copolymers of styrene-based compounds and conjugated diene compounds, and hydrogenated products thereof. One of these may be used alone, or two or more of these may be used in combination. Examples of the styrene-based compound include styrene; alkylstyrenes such as α-methylstyrene, p-methylstyrene, and p-t-butylstyrene; p-methoxystyrene; and vinylnaphthalene. Meanwhile, examples of the conjugated diene compound include butadiene, isoprene, piperylene, methylpentadiene, phenylbutadiene, 3,4-dimethyl-1,3-hexadiene, 4,5-diethyl-1,3-octadiene, and the like.

Specific examples of such a styrene-based thermoplastic elastomer include a styrene-butadiene-styrene copolymer (SBS), a styrene-isoprene-styrene copolymer (SIS), a styrene-ethylene/butylene-styrene copolymer (SEBS), and a styrene-ethylene/propylene-styrene copolymer (SEPS). Among these, SEBS is preferable from the viewpoint of having a tendency to further improve the rigidity and the impact strength of the resin composition.

Examples of the reactive group capable of reacting with the first resin include an acid anhydride group (—CO—O—OC—), a carboxyl group (—COOH), an epoxy group [—C$_2$O (three-membered ring structure consisting of two carbon atoms and one oxygen atom)], an oxazoline group (—C$_3$H$_4$NO), an isocyanate group (—NCO), and the like. Among these, the reactive group is preferably the acid anhydride group from the viewpoint of having a tendency to be highly reactive when the polyamide resin is used as the first resin.

In addition, the method for adding the reactive group to the elastomer is not particularly limited, and known methods can be employed as appropriate. An example of the method of adding the acid anhydride group to the elastomer includes a method in which an acid anhydride is used as a monomer. Examples of the acid anhydride include maleic anhydride, phthalic anhydride, itaconic anhydride, succinic anhydride, glutaric anhydride, adipic anhydride, citraconic anhydride, tetrahydrophthalic anhydride, and butenylsuccinic anhydride. One of the aforementioned acid anhydrides may be used alone, or two or more of these may be used in combination. Above all, maleic anhydride, phthalic anhydride, and itaconic anhydride are preferable, and maleic anhydride is more preferable, from the viewpoint of having a tendency to be highly reactive.

Specific examples of the modified elastomer according to the present invention include maleic anhydride-modified olefin-based thermoplastic elastomers such as maleic anhydride-modified EPR, maleic anhydride-modified PBR, maleic anhydride-modified EBR, maleic anhydride-modified EOR, and maleic anhydride-modified POR; maleic anhydride-modified styrene-based thermoplastic elastomers such as maleic anhydride-modified SEBS, maleic anhydride-modified SBS, maleic anhydride-modified SIS, and maleic anhydride-modified SEPS; and the like. One of such modified elastomers may be used alone, or two or more of these may be used in combination. Above all, preferable are maleic anhydride-modified PBR, maleic anhydride-modified EBR, and maleic anhydride-modified EOR, from the viewpoint of more easily making the resins compatible with each other when a polyolefin resin is used as the second resin according to the present invention.

Additionally, the weight average molecular weight (in terms of polystyrene standards, temperature: 140 to 150° C.) of the modified elastomer according to the present invention measured by gel permeation chromatography (GPC) is not particularly limited. Nevertheless, the weight average molecular weight is preferably 10,000 to 500,000, more preferably 20,000 to 500,000, and further preferably 25,000 to 400,000, from the viewpoint that if the weight average molecular weight is larger, there is a tendency to improve the impact strength of the resin composition.

<Reaction Product of First Resin and Modified Elastomer>

A reaction product of the first resin and the modified elastomer according to the present invention is a component produced when the reactive group of the modified elastomer reacts with the first resin.

The method for obtaining such a reaction product of the first resin and the modified elastomer is not particularly limited. In producing the resin composition of the present invention, the reaction product can be obtained in the resin composition of the present invention by heating and melt-kneading a material mixture including the first resin and the modified elastomer. The heating and melt-kneading conditions are not particularly limited. Although the details will also be described in Method for Producing Resin Composition in the present invention later, it is preferable to use a kneading machine or the like at a temperature of 100 to 350° C. for 0.01 to 1.0 hours.

<Resin Composition>

The resin composition of the present invention has a co-continuous phase structure including a continuous phase A formed of the first resin and a continuous phase B formed of the second resin, and also has a dispersed domain a distributed in the continuous phase A, a finely dispersed subdomain a' distributed in the dispersed domain a, a dispersed domain b distributed in the continuous phase B, and a finely dispersed subdomain b' distributed in the dispersed domain b.

In the present invention, the phase structure of the resin composition can be observed by using an electron microscope. An example of such an observation method includes a method in which oxygen plasma etching treatment was performed at 100 W for 1 minute on a cross section of an injection-molded resin composition, and then the cross section is observed using an field-emission scanning electron microscope (FE-SEM, manufactured by Hitachi High-Tech Manufacturing & Service Corporation, "S-4300 TYPE II", accelerating voltage: 3 kV). Note that each part in the resin composition can be identified by checking the presence or absence of a peak derived from each resin by energy-dispersive X-ray spectroscopy (EDX) during the field-emission scanning electron microscope observation.

The resin composition of the present invention has the co-continuous phase structure including the continuous phase A formed of the first resin and the continuous phase B formed of the second resin. In the present invention, a co-continuous phase structure refers to a structure, in which two or more continuous phases (in the present invention, the continuous phase A and the continuous phase B) are connected to each other continuously in a three-dimensional manner.

In such a co-continuous phase structure, a ratio of the content of the continuous phase A (total content including the dispersed domain a and the finely dispersed subdomain a' described below) and the content of the continuous phase B (total content including the dispersed domain b and the finely dispersed subdomain b' described below) (the mass of the continuous phase A:the mass of the continuous phase B) is preferably 5:1 to 1:5, and more preferably 3:1 to 1:3. If the content of the continuous phase B relative to the continuous phase A is either less than the lower limit or more than the upper limit, there is a tendency that no co-continuous phase is formed.

(Continuous Phase A)

In the resin composition of the present invention, the continuous phase A includes at least one continuous phase in which the dispersed domain a is present in a dispersed state. The dispersed domain a includes a dispersed domain formed of at least one selected from the group consisting of the second resin and the reaction product of the first resin and the modified elastomer. From the viewpoint of having a tendency to be distributed in the continuous phase A, such a dispersed domain a is preferably a dispersed domain formed of the second resin and a dispersed domain formed of the reaction product of the first resin and the modified elastomer.

The content of such a dispersed domain a is preferably 1 to 50% by area, more preferably 5 to 40% by area, based on a total area of the continuous phase A (the area includes the dispersed domain a and the finely dispersed subdomain a') in a cross section of a molded resin composition. If the content of the dispersed domain a is less than the lower limit, there is a tendency that the impact strength is lowered. On the other hand, if the content is more than the upper limit, there is a tendency that it is difficult to form the dispersed domain a.

Moreover, the dispersed domain a has an average diameter of preferably 0.05 to 8 µm, more preferably 0.1 to 4 µm, the average diameter calculated from all dispersed domains a including the dispersed domain a having the finely dispersed subdomain a' and the dispersed domain a not having the finely dispersed subdomain to be described later. If the average diameter of all the dispersed domains a is smaller than the lower limit, there is a tendency that the rigidity is lowered. On the other hand, if the average diameter is larger than the upper limit, there is a tendency that it is difficult to form the dispersed domain a.

Further, in the dispersed domains a, the dispersed domain a having the finely dispersed subdomain a' to be described later has an average diameter of preferably 0.1 to 10 µm, more preferably 0.2 to 6 µm. If the average diameter of the dispersed domain a having the finely dispersed subdomain a' is smaller than the lower limit, there is a tendency that it is difficult to have the finely dispersed subdomain a'. On the other hand, if the average diameter is larger than the upper limit, there is a tendency that it is difficult to form the dispersed domain a.

Note that, in the present invention, the average diameter of these dispersed domains a can be obtained by averaging values of diameters of any 100 or more dispersed domains in a molded resin composition, the diameters obtained by measuring the dispersed domains with a scanning electron microscope (SEM). In addition, such a diameter means the maximum diameter of a cross section of each of the dispersed domains. When a dispersed domain does not have a circular cross section, the diameter means a diameter of the maximum circumscribed circle of the cross section.

Furthermore, in the resin composition of the present invention, the dispersed domain a includes at least one dispersed domain a in which the finely dispersed subdomain a' is present in a dispersed state. When the dispersed domain a is a dispersed domain formed of the second resin, the finely dispersed subdomain a' is a finely dispersed subdomain formed of at least one selected from the group consisting of the first resin, the modified elastomer, and the reaction product of the first resin and the modified elastomer. Meanwhile, when the dispersed domain a is a dispersed domain formed of the reaction product of the first resin and the modified elastomer, the finely dispersed subdomain a' is a finely dispersed subdomain formed of at least one selected from the group consisting of the first resin, the second resin, and the modified elastomer. From the viewpoint of being more easily made compatible, such a finely dispersed subdomain a' is preferably present in the dispersed domain a formed of the second resin, and is more preferably a finely dispersed subdomain formed of the reaction product of the first resin and the modified elastomer.

The content of such a finely dispersed subdomain a' is preferably 1 to 50% by area, more preferably 5 to 40% by area, based on a total area of the dispersed domain a (the total area includes the finely dispersed subdomain a') in a cross section of a molded resin composition. If the content of the finely dispersed subdomain a' is less than the lower limit, there is a tendency that the impact strength is lowered. On the other hand, if the content is more than the upper limit, there is a tendency that it is difficult to form the finely dispersed subdomain a'.

In addition, the average diameter of the finely dispersed subdomain a' is preferably 5 to 500 nm, more preferably 10 to 450 nm, and further preferably 15 to 400 nm. If the average diameter is smaller than the lower limit, there is a tendency that the rigidity is lowered. On the other hand, if the average diameter is larger than the upper limit, there is a tendency that it is difficult to form the finely dispersed subdomain a'. Note that, in the present invention, the average diameter of such a finely dispersed subdomain a' can be obtained in the same way for the average diameter of the dispersed domain a described above.

(Continuous Phase B)

In the resin composition of the present invention, the continuous phase B includes at least one continuous phase in which the dispersed domain b is present in a dispersed state. The dispersed domain b is a dispersed domain formed of at least one selected from the group consisting of the first resin and the reaction product of the first resin and the modified elastomer. From the viewpoint of being more easily made compatible with the continuous phase B, such a dispersed domain b is preferably a dispersed domain formed of the reaction product of the first resin and the modified elastomer.

The content of such a dispersed domain b is preferably 1 to 50% by area, more preferably 5 to 40% by area, based on a total area of the continuous phase B (the total area includes the dispersed domain b and the finely dispersed subdomain b') in a cross section of a molded resin composition. If the content of of the dispersed domain b is less than the lower limit, there is a tendency that the impact strength is lowered. On the other hand, if the content is more than the upper limit, there is a tendency that it is difficult to form the dispersed domain b.

Moreover, the dispersed domain b has an average diameter of preferably 0.05 to 8 μm, more preferably 0.1 to 4 μm, the average diameter calculated from all dispersed domains b including the dispersed domain b having the finely dispersed subdomain b' and the dispersed domain b not having the finely dispersed subdomain to be described later. If the average diameter of all of the dispersed domains b is smaller than the lower limit, there is a tendency that the rigidity is lowered. On the other hand, if the average diameter is larger than the upper limit, there is a tendency that it is difficult to form the dispersed domain b.

Further, in the dispersed domains b, the dispersed domain b having the finely dispersed subdomain b' to be described later has an average diameter of preferably 0.1 to 10 μm, more preferably 0.2 to 6 μm. If the average diameter of the dispersed domain b having the finely dispersed subdomain b' is smaller than the lower limit, there is a tendency that it is difficult to have the finely dispersed subdomain b'. On the other hand, if the average diameter is larger than the upper limit, there is a tendency that it is difficult to form the dispersed domain b. Note that, in the present invention, the average diameter of such a dispersed domain b can be obtained in the same way for the average diameter of the dispersed domain a described above.

Furthermore, in the resin composition of the present invention, the dispersed domain b includes at least one dispersed domain b in which the finely dispersed subdomain b' is present in a dispersed state. When the dispersed domain b is a dispersed domain formed of the first resin, the finely dispersed subdomain b' is a finely dispersed subdomain formed of at least one selected from the group consisting of the second resin, the modified elastomer, and the reaction product of the first resin and the modified elastomer. Meanwhile, when the dispersed domain b is a dispersed domain formed of the reaction product of the first resin and the modified elastomer, the finely dispersed subdomain b' is a finely dispersed subdomain formed of at least one selected from the group consisting of the first resin, the second resin, and the modified elastomer. From the viewpoint of being more easily made compatible, such a finely dispersed subdomain b' is preferably present in the dispersed domain b formed form the reaction product of the first resin and the modified elastomer, and is more preferably a finely dispersed subdomain formed of the modified elastomer.

The content of such a finely dispersed subdomain b' is preferably 1 to 50% by area, more preferably 5 to 40% by area, based on a total area of the dispersed domain b (the total area includes the finely dispersed subdomain b') in a cross section of a molded resin composition. If the content of the finely dispersed subdomain b' is less than the lower limit, there is a tendency that the impact strength is lowered. On the other hand, if the content is more than the upper limit, there is a tendency that it is difficult to form the finely dispersed subdomain b'.

In addition, the average diameter of the finely dispersed subdomain b' is preferably 5 to 500 nm, more preferably 10 to 450 nm, and further preferably 15 to 400 nm. If the average diameter is smaller than the lower limit, there is a tendency that the rigidity is lowered. On the other hand, if the average diameter is larger than the upper limit, there is a tendency that it is difficult to form the finely dispersed subdomain b'. Note that, in the present invention, the average diameter of such a finely dispersed subdomain b' can be obtained in the same way for the average diameter of the dispersed domain a described above.

Additionally, the resin composition of the present invention preferably further has a dispersed domain formed of the modified elastomer in at least one continuous phase selected from the group consisting of the continuous phase A and the continuous phase B, from the viewpoint of having a tendency to further improve the impact strength. When such a dispersed domain formed of the modified elastomer is contained, the content is preferably 1 to 30% by mass, more preferably 5 to 20% by mass, based on a total content of the continuous phase containing the dispersed domain (the total content includes the dispersed domains and the finely dispersed subdomains). If the content of the dispersed domain formed of the modified elastomer is less than the lower limit, there is a tendency that the effect of improving the impact strength is not demonstrated. On the other hand, if the content is more than the upper limit, there is a tendency that the rigidity is lowered.

Moreover, besides the first resin, the second resin, the modified elastomer, and the reaction product of the first resin and the modified elastomer, the resin composition of the present invention may further comprise other components as necessary, as long as the effects of the present invention are not inhibited. Examples of such other components include thermoplastic resins other than the aforementioned components, antioxygen agent, anti-UV agent, heat-stable agent, a flame retardant, an auxiliary flame retardant, a filler, a coloring agent, an antimicrobial agent, and an antistatic agent. One of these may be used alone, or two or more of these may be used in combination. When the resin composition comprises these other components, the content is preferably 40% by mass or less based on a total content of the resin composition.

Examples of the other thermoplastic resins include polyester-based resins (polybutylene terephthalate, polyethylene terephthalate, polytrimethylene terephthalate, polybutylene succinate, polyethylene succinate, polylactide, and polyhydroxyalkanoates), polycarbonate resins, and the like. One of these may be used alone, or two or more of these may be used in combination.

Examples of the flame retardant include halogen-containing flame retardants (halogenated aromatic compounds and the like), phosphorus-containing flame retardants (nitrogen-containing compounds of phosphoric acid salts, phosphoric acid esters, and the like), nitrogen-containing flame retardants (guanidine, triazine, melamine, derivatives thereof, and the like), inorganic flame retardants (metal hydroxides and the like), boron-containing flame retardants, silicone-containing flame retardants, sulfur-containing flame retardants, red phosphorus-containing flame retardants, and the like.

Examples of the auxiliary flame retardant include various antimony compounds, metal compounds including zinc, metal compounds including bismuth, magnesium hydroxide, clay silicates, and the like.

Examples of the filler include glass components (glass fiber, glass beads, glass flake, and the like); silica; inorganic fibers (glass fiber, alumina fiber, carbon fiber); graphites; silicate compounds (calcium silicate, aluminium silicate, kaolin, talc, clay, and the like); metal oxides (iron oxide, titanium oxide, zinc oxide, antimony oxide, alumina, and the like); carbonates and sulfates of metals such as calcium, magnesium, and zinc; and organic fibers (aromatic polyester fiber, aromatic polyamide fiber, fluorinated resin fiber, polyimide fiber, plant fiber, and the like). Examples of the coloring agent include pigments, dyes, and the like.

<Method for Producing Resin Composition>

The resin composition of the present invention can be obtained by first allowing the first resin and the modified elastomer to react with each other in a particular ratio, and then combining the mixture with the second resin. From the viewpoints that the modified elastomer can function more effectively and that the resin composition of the present invention can be efficiently and reliably obtained, a preferable example of such a production method is a method comprising first melt-kneading the first resin and the modified elastomer to prepare a resin mixture, and then melt-kneading the resin mixture and the second resin.

An example of the method for preparing the resin mixture includes a method in which the first resin and the modified elastomer are melt-kneaded using a kneading machine. Incidentally, the resin mixture obtained in this manner may be a solid solidified by pelletization or the like, or may be a melt.

Examples of the kneading machine include extruders (a single-screw extruder, a twin-screw melt-kneading extruder, and the like), kneaders, and mixers (a high speed flow type mixer, a paddle mixer, a ribbon mixer, and the like). One of these may be used alone, or two or more of these may be used in combination. Moreover, when the two or more are used in combination, the machines may be operated in a continuous manner, or may be operated in a batch manner. Further, the first resin and the modified elastomer may be kneaded at once, or one of them may be kneaded as added and introduced multiple times (multi-stage blending).

The melt-kneading temperature in preparing the resin mixture is not particularly limited. It cannot be said generally because the temperature is adjusted as appropriate, depending on the types of the first resin and the modified elastomer. Nevertheless, from the viewpoint that each compound according to the present invention can be mixed in a molten state, the temperature is preferably 100 to 350° C., more preferably 180 to 320° C., and further preferably 200 to 300° C.

An example of the method for melt-kneading the resin mixture and the second resin includes the same method as in the method using a kneading machine exemplified in the method for preparing the resin mixture. Moreover, in this melt-kneading, the resin mixture and the second resin may be kneaded at once, or one of them may be kneaded as added and introduced multiple times (multi-stage blending). Further, the melt-kneading temperature for the resin mixture and the second resin are as described in the melt-kneading in preparing the resin mixture above.

In addition, in the method for producing the resin composition of the present invention, the resin mixture obtained as the solid and/or melt and the second resin may be melt-kneaded together; alternatively, a resin composition may be obtained using a kneading machine of multi-stage blending type or the like in a manner that the first resin and the modified elastomer are melt-kneaded at an upstream side, then mixed with the second resin at a downstream side, and melt-kneaded.

In the method for producing the resin composition of the present invention, it is important that an amount of the first resin fed be in a particular ratio to a total mass of amounts of the first resin, the second resin, and the modified elastomer fed.

The present inventors have found out the followings in the method comprising melt-kneading the first resin and the modified elastomer to prepare the resin mixture, and then melt-kneading the resin mixture and the second resin as described above. Specifically, when the amount of the first resin fed is within a specific range relative to the total mass of the amounts of the first resin, the second resin, and the modified elastomer fed, the resin composition having the above-described particular structure of the present invention is obtained, and significantly excellent impact strength is demonstrated.

In the present invention, when the first resin is the PA11-based resin and the second resin is the polyolefin resin, the amount of the PA11-based resin fed is preferably 40 to 69% by mass, more preferably 50 to 65% by mass, and further preferably 59 to 63% by mass, of the total mass of the amounts of the PA11-based resin, the polyolefin resin, and the modified elastomer fed. Furthermore, in the present invention, when the first resin is the PA6 and the second resin is the polyolefin resin, the amount of the PA6 fed is preferably 26 to 44% by mass, more preferably 30 to 40% by mass, and further preferably 33 to 37% by mass, of the total mass of the amounts of the PA6, the polyolefin resin, and the modified elastomer fed. If the amount of the first resin fed is smaller than the lower limit, there are tendencies that the co-continuous phase is not formed in the resin composition, and that the impact strength is lowered. On the other hand, if the amount is larger than the upper limit, there are tendencies that the co-continuous phase is not formed in the resin composition, and the impact strength is lowered.

Moreover, in the present invention, when the first resin is the PA11-based resin and the second resin is the polyolefin resin, the amount of the polyolefin resin fed is preferably 20 to 50% by mass, more preferably 25 to 40% by mass, of the total mass of the amounts of the PA11-based resin, the polyolefin resin, and the modified elastomer fed. Furthermore, in the present invention, when the first resin is the PA6 and the second resin is the polyolefin resin, the polyolefin resin fed is preferably 45 to 65% by mass, more preferably 50 to 60% by mass, of the total mass of the amounts of the PA6, the polyolefin resin, and the modified elastomer fed. If the amount of the polyolefin resin fed is either smaller than the lower limit or larger the upper limit, there is a tendency that it is difficult to form the co-continuous phase.

Moreover, in the present invention, when the first resin is the PA11-based resin and the second resin is the polyolefin resin, the amount of the modified elastomer fed is preferably 1 to 30% by mass, more preferably 5 to 20% by mass, of the total mass of the amounts of the PA11-based resin, the polyolefin resin, and the modified elastomer fed. Furthermore, in the present invention, when the first resin is the PA6 and the second resin is the polyolefin resin, the amount of the modified elastomer fed is preferably 1 to 30% by mass, more preferably 5 to 20% by mass, of the total mass of the amounts of the PA6, the polyolefin resin, and the modified elastomer fed. If the amount of the modified elastomer fed is smaller than the lower limit, there is a tendency that sufficient impact strength is not obtained. On the other hand, if the amount is larger than the upper limit, there is a tendency that the rigidity is lowered.

Such a production method makes it possible to obtain the resin composition of the present invention efficiently and reliably. A resin molded product to be obtained therefrom may be a solid solidified by pelletization or the like, or may be a melt.

<Molded Product>

The resin composition of the present invention may be molded in any way, and a method therefor is not particularly limited. Moreover, the form, the size, the thickness, and so forth of a molded product thus obtained are also not particularly limited, and the use is not particularly limited, either. For example, the molded product can be used as exterior parts, interior parts, and structural parts, and so forth of automobiles, rolling stocks, ships, airplanes, and so on. Further, examples of the automotive parts include automotive exterior parts, automotive interior parts, automotive structural parts, automotive impact absorber parts, automotive pedestrian protection parts, automotive passenger protection parts, engine room interior components, and the like. Specific examples thereof include a impact absorber, a bumper, a spoiler, a cowling, a front grille, a garnish, a hood, a trunk lid, a fender panel, a door panel, a roof panel, an instrument panel, a door trim, a quarter trim, a roof lining, a pillar garnish, a deck trim, a tonneau board, a package tray, a dashboard, a center console, a kicking plate, a switch base, a seat back board, a seat frame, an armrest, a sun visor, an intake manifold, an engine head cover, an engine undercover, an oil filter housing, an air filter box, and housings for on-board electronic components (such as ECU and TV monitor).

Furthermore, the molded product can also be used as, for example, interior parts, exterior parts, and structural parts of buildings, furniture, and so forth. Specifically, the molded product can be used as, for example, door coating materials, door structural parts, coating materials and structural parts for various types of furniture (such as desks, chairs, shelves, and drawers), and the like. Besides, the molded product can also be used as packaging materials, containers (such as trays), protection parts, partition parts, and cases and structural materials for consumer electronics (such as flat panel TVs, refrigerators, washing machines, vacuum cleaners, mobile phones, handheld game consoles, and laptop computers).

EXAMPLES

Hereinafter, the present invention will be described more specifically based on Examples and Comparative Examples. However, the present invention is not limited to the following Examples. Note that performances of a resin composition obtained in each Example and Comparative Example were evaluated by methods illustrated below.

<Physical Property of Resin Composition>

(Measurement of Charpy Impact Strength)

Test specimens for property measurement obtained by each Example and Comparative Examples were used to measure the Charpy impact strength ($kJ/m^2$) according to JIS K 7111-1. Note that the measurement was performed under conditions of temperature: 23° C., direction of impact: edgewise, and notch type: A.

(Measurement of Flexural Modulus)

Test specimens for property measurement obtained by each Example and Comparative Example were used to measure the flexural modulus (MPa) according to JIS K 7171. Note that the measurement was performed as follows. A test specimen was supported by two supports (radius of curvature: 5 mm) with a distance between the supports (L) being 64 mm, and a load was applied to the specimen at a speed of 2 mm/minute from a point of application (radius of curvature: 5 mm) set at the midpoint between the supports.

(Morphology Observation)

First, oxygen plasma etching treatment was performed by using a plasma reactor (manufactured by Yamato Scientific Co., Ltd.,"PR300") at 100 W for 1 minute on the fractured surface of the test specimen for physical property measurement subjected to the Charpy impact strength measurement. Then, osmium coating processing was performed on the fractured surface using an osmium coater (manufactured by Vacuum Device Inc., "HPC-1S") for 5 seconds. Then, the fractured surface was observed using a field-emission scanning electron microscope (FE-SEM, manufactured by Hitachi High-Tech Manufacturing & Service Corporation, "S-4300 TYPE II") under a condition of an accelerating voltage at 3 kV.

Moreover, each part thus observed was subjected to elemental analysis using an energy-dispersive X-ray spectroscopy (EDX) system provided to the FE-SEM, and components constituting the part were identified. Further, in each of the obtained images, diameters of any 100 dispersed domains and any 100 finely dispersed subdomains were measured, and the values were averaged to obtain average diameters of the dispersed domains and the finely dispersed subdomains. Note that the diameter was the maximum diameter of a cross section of each of the dispersed domains and the finely dispersed subdomains, or when the cross section was not circular, a diameter of the maximum circumscribed circle of the cross section.

Example 1

First, polyamide 11 (PA11, manufactured by Arkema K. K., "RILSAN BMNO", weight average molecular weight: 18,000) was mixed with a maleic anhydride-modified ethylene-1-butene copolymer (m-EBR, manufactured by Mitsui Chemicals, Inc., "TAFMER MH7020") by dry blending in advance in a manner that the mass ratio (the mass of PA11:the mass of m-EBR) was 60:10. The mixture was heated and melt-kneaded using a twin-screw melt-kneading extruder (manufactured by Technovel Corporation, "KZW15-60MG") with a screw diameter of 15 mm and L/D=59 under conditions of a mixing temperature at 210° C., an extrusion speed of 2 kg/hour, and a screw revolution of 200 rpm. Then, the melt-kneaded product thus extruded was cut using a pelletizer to obtain a resin mixture in a pellet form.

Then, the obtained resin mixture was mixed with polypropylene (PP, manufactured by Japan Polypropylene Corporation, "NOVATEC MA1B", weight average molecular weight: 312,000) by dry blending in a manner that the mass ratio (the mass of the resin mixture:the mass of PP) was 70:30. The mixture was heated and melt-kneaded using the twin-screw melt-kneading extruder under conditions of a temperature at 210° C., an extrusion speed of 2 kg/hour, and a screw revolution of 200 rpm. Then, the melt-kneaded product thus extruded was cut using a pelletizer to obtain a resin composition (thermoplastic resin composition) in a pellet form. Subsequently, the obtained resin composition was injection-molded using an injection molding machine (manufactured by Nissei Plastic Industrial Co., Ltd., "PS40E2ASE") under injection conditions of a mixing temperature at 200° C. and a mold temperature at 58° C. Thus, test specimens for physical property measurement were prepared (length 80 mm×width 10.0 mm×thickness 4.0 mm).

Figure 2:
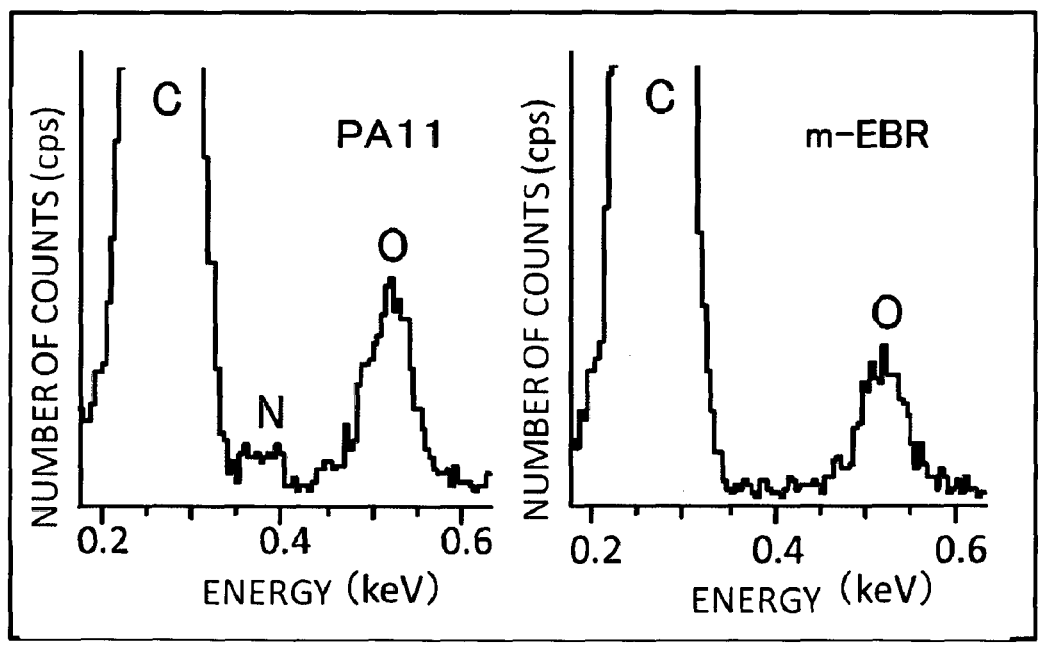
FIG. 2 shows graphs illustrating energy-dispersive X-ray spectroscopy (EDX) patterns obtained during the field-emission scanning electron microscope (FE-SEM) observation of the Example 1 test specimen for physical property measurements.

The obtained test specimens for physical property measurement were used to measure the Charpy impact strength and to measure the flexural modulus. Table 1 shows the obtained results and the proportion in the resin composition. In addition, the test specimen for physical property measurement subjected to the Charpy impact strength measurement was used to observe the morphology. FIG. 1 shows a field-emission scanning electron microscope (FE-SEM) photograph of the test specimen for physical property measurement thus obtained. Moreover, FIG. 2 shows the energy-dispersive X-ray spectroscopy (EDX) patterns of PA11 and m-EBR as examples of the energy-dispersive X-ray spectroscopy (EDX) result. Note that, in FIG. 2, the left graph shows the EDX pattern of PA11, while the right graph shows the EDX pattern of m-EBR. In the two graphs, the scale of the vertical axis is the same. Further, Table 2 shows the average diameters of dispersed domains having finely dispersed subdomains and of the finely dispersed subdomains thus observed.

Comparative Example 1

A resin composition (thermoplastic resin composition) in a pellet form and test specimens for physical property measurement were obtained in the same manner as in Example 1 except that maleic anhydride-modified polypropylene (m-PP, manufactured by Sanyo Chemical Industries, Ltd., "YUMEX 1001", weight average molecular weight: 40,000) was used in place of m-EBR. The obtained test specimens for physical property measurement were used to measure the Charpy impact strength and to measure the flexural modulus. Table 1 shows the obtained results and the proportion in the resin composition.

Comparative Example 2

Figure 3:
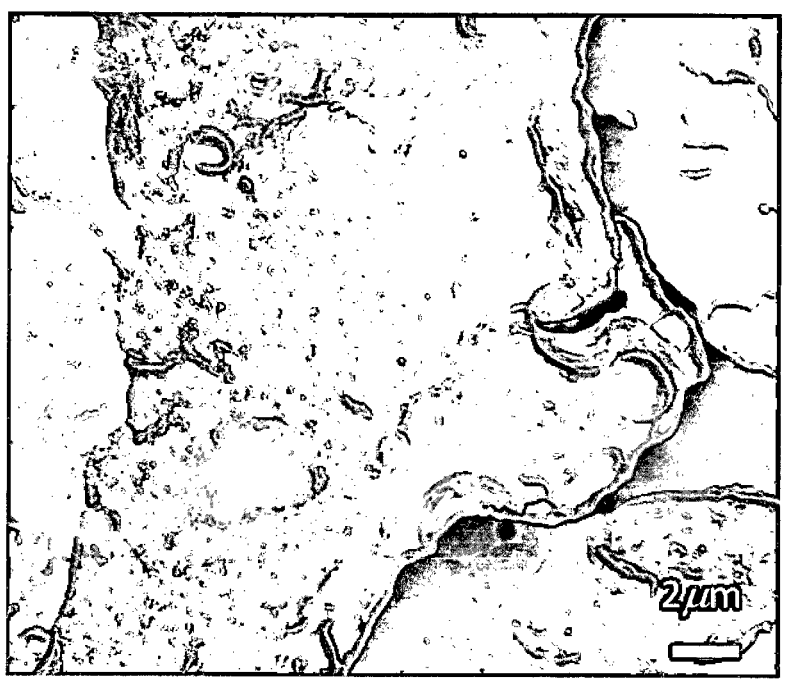
FIG. 3 is a field-emission scanning electron microscope (FE-SEM) photograph of a Comparative Example 2 test specimen for physical property measurements.

First, m-EBR and PP were mixed together by dry blending in a manner that the mass ratio (the mass of m-EBR: the mass of PP) was 10:90. Then, the mixture was heated and melt-kneaded under the same conditions as in Example 1 to obtain a melt-kneaded product. A resin composition (thermoplastic resin composition) in a pellet form and test specimens for physical property measurement were obtained in the same manner as in Example 1 except that such a melt-kneaded product was used. The obtained test specimens for physical property measurement were used to measure the Charpy impact strength and to measure the flexural modulus. Table 1 shows the obtained results and the proportion in the resin composition. In addition, the test specimen for physical property measurement subjected to the Charpy impact strength measurement was used to observe the morphology. FIG. 3 shows a field-emission scanning electron microscope (FE-SEM) photograph of the test specimen for physical property measurement. The structure of the obtained resin composition was a structure having a dispersed domain formed of m-EBR in a continuous phase formed of PP (sea-island structure).

Comparative Example 3

Figure 4:
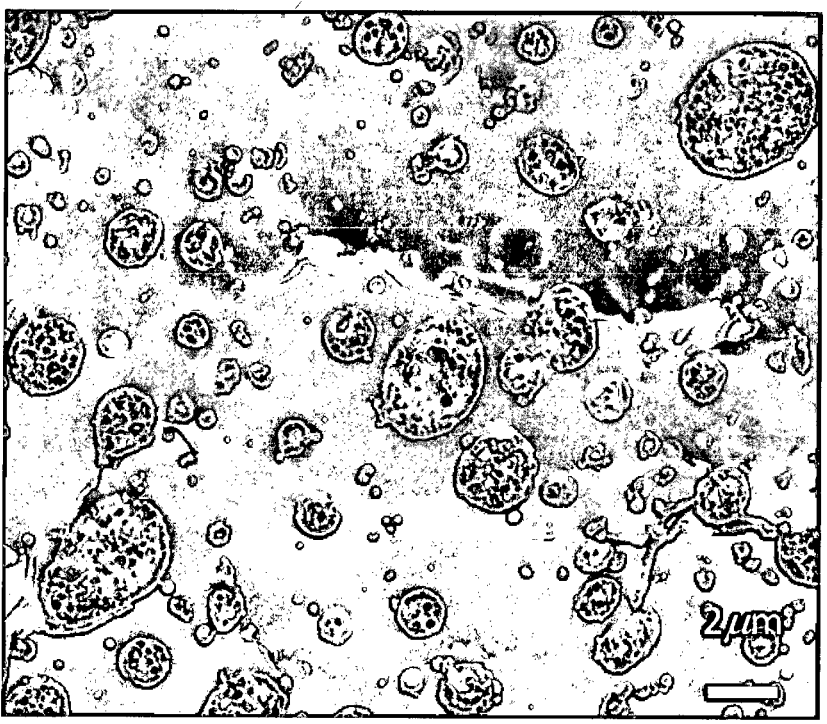
FIG. 4 is a field-emission scanning electron microscope (FE-SEM) photograph of a Comparative Example 3 test specimen for physical property measurements.

A resin mixture was obtained in the same manner as in Example 1 except that the mass ratio of PA11 and m-EBR (the mass of PA11:the mass of m-EBR) was 20:10. Then, a resin composition (thermoplastic resin composition) in a pellet form and test specimens for physical property measurement were obtained in the same manner as in Example 1 except that the mass ratio of the obtained resin mixture and PP (the mass of the resin mixture:the mass of PP) was 30:70. The obtained test specimens for physical property measurement were used to measure the Charpy impact strength and to measure the flexural modulus. Table 1 shows the obtained results and the proportion in the resin composition. In addition, the test specimen for physical property measurement subjected to the Charpy impact strength measurement was used to observe the morphology. FIG. 4 shows a field-emission scanning electron microscope (FE-SEM) photograph of the test specimen for physical property measurement. The structure of the obtained resin composition was a structure having a continuous phase formed of PP, a dispersed domain formed of PA11 distributed in the continuous phase, and a finely dispersed subdomain formed of PP or the reaction product of PA11 and m-EBR distributed in the dispersed domain (salami structure).

Comparative Example 4

Figure 5:
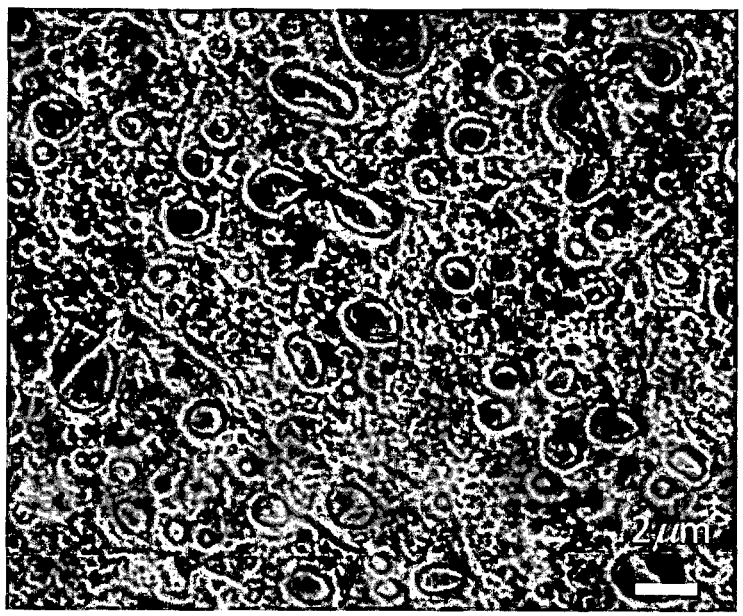
FIG. 5 is a field-emission scanning electron microscope (FE-SEM) photograph of a Comparative Example 4 test specimen for physical property measurements.

A resin mixture was obtained in the same manner as in Example 1 except that the mass ratio of PA11 and m-EBR (the mass of PA11:the mass of m-EBR) was 70:10. Then, a resin composition (thermoplastic resin composition) in a pellet form and test specimens for physical property measurement were obtained in the same manner as in Example 1 except that the mass ratio of the obtained resin mixture and PP (the mass of the resin mixture:the mass of PP) was 80:20. The obtained test specimens for physical property measurement were used to measure the Charpy impact strength and to measure the flexural modulus. Table 1 shows the obtained results and the proportion in the resin composition. In addition, the test specimen for physical property measurement subjected to the Charpy impact strength measurement was used to observe the morphology. FIG. 5 shows a field-emission scanning electron microscope (FE-SEM) photograph of the test specimen for physical property measurement. The structure of the obtained resin composition was a structure having a dispersed domain formed of PP in a continuous phase formed of PA11 (phase-inverted sea-island structure).

TABLE 1

| | | Example 1 | Comparative Example 1 | Comparative Example 2 | Comparative Example 3 | Comparative Example 4 |
|---|---|---|---|---|---|---|
| proportion [parts by mass] | PA11 | 60 | 60 | — | 20 | 70 |
| | m-EBR | 10 | — | 10 | 10 | 10 |
| | m-PP | — | 10 | — | — | — |
| | PP | 30 | 30 | 90 | 70 | 20 |
| physical properties | Charpy impact strength [kJ/m$^2$] | 90 | 3.3 | 3.5 | 10 | 60 |
| | Flexural modulus [MPa] | 1180 | 1000 | 1200 | 1240 | 920 |

TABLE 2

Example 1

| Continuous phase | Average diameter of dispersed domains having finely dispersed subdomains [µm] | Average diameter of finely dispersed subdomains [nm] |
|---|---|---|
| PA11 | 1.1 | 360 |
| PP | 1.5 | 150 |

Example 2

Figure 6:
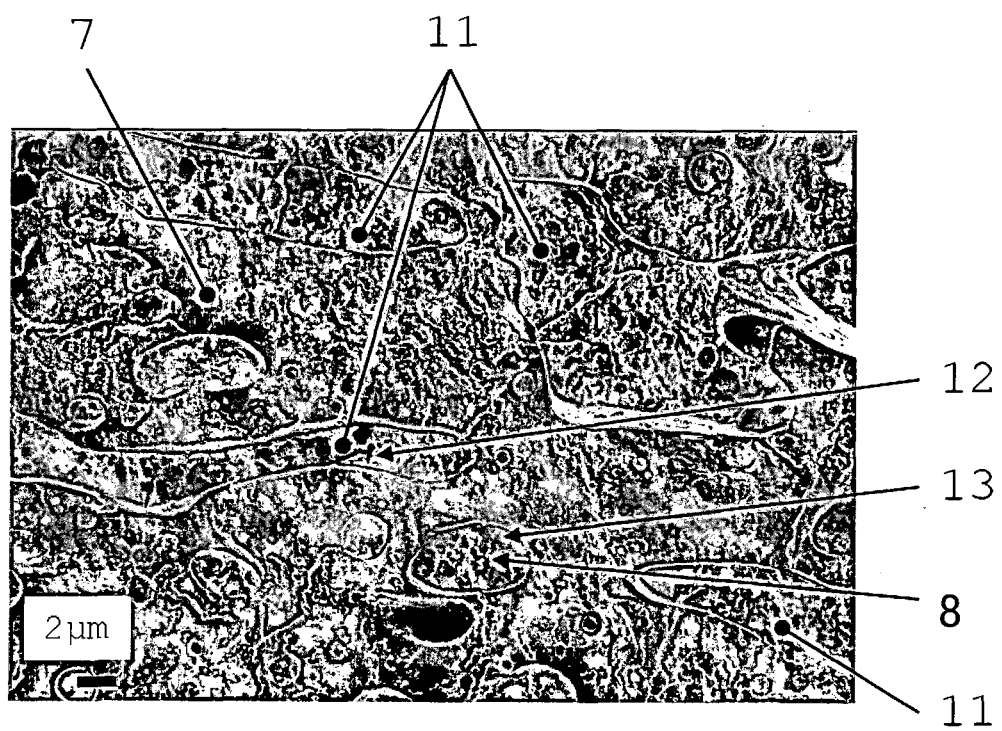
FIG. 6 is a field-emission scanning electron microscope (FE-SEM) photograph of an Example 2 test specimen for physical property measurements.
Figure 7:
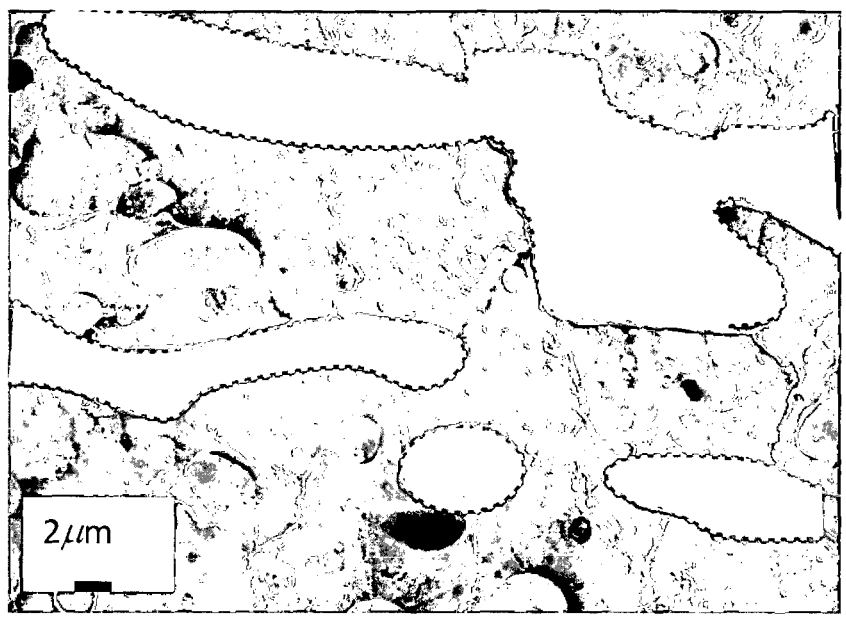
FIG. 7 is a field-emission scanning electron microscope (FE-SEM) photograph obtained by excluding part corresponding to a phase formed of PA6 from the photograph shown in FIG. 6.
Figure 8:
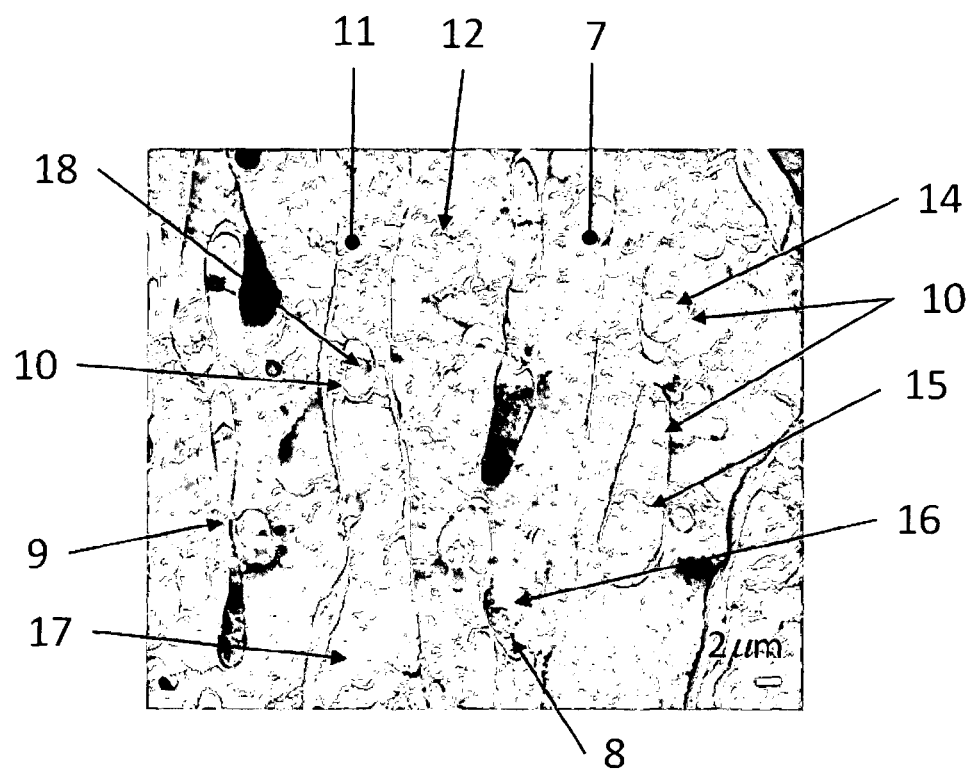
FIG. 8 is a field-emission scanning electron microscope (FE-SEM) photograph of an Example 2 test specimen for physical property measurements.

A resin mixture was obtained in the same manner as in Example 1 except that polyamide 6 (PA6, manufactured by Ube Industries, Ltd., trade name: "1010X1", number average molecular weight: 10,000) was used in place of polyamide 11, and that the mass ratio of PA6 and m-EBR (the mass of PA6:the mass of m-EBR) was 35:10. Then, a resin composition (thermoplastic resin composition) in a pellet form and test specimens for physical property measurement were obtained in the same manner as in Example 1 except that the mass ratio of the resin mixture and PP (the mass of the resin mixture:the mass of PP) was 45:55. The obtained test specimens for physical property measurement were used to measure the Charpy impact strength and to measure the flexural modulus. Table 3 shows the obtained results and the proportion in the resin composition. In addition, the test specimen for physical property measurement subjected to the Charpy impact strength measurement was used to observe the morphology. Any two field-emission scanning electron microscope (FE-SEM) photographs of the test specimen for physical property measurement are shown in FIG. 6 and FIG. 8 respectively. Moreover, FIG. 7 shows a field-emission scanning electron microscope (FE-SEM) photograph obtained by excluding part corresponding to a phase formed of PA6 from the photograph shown in FIG. 6.

Comparative Example 5

Figure 9:
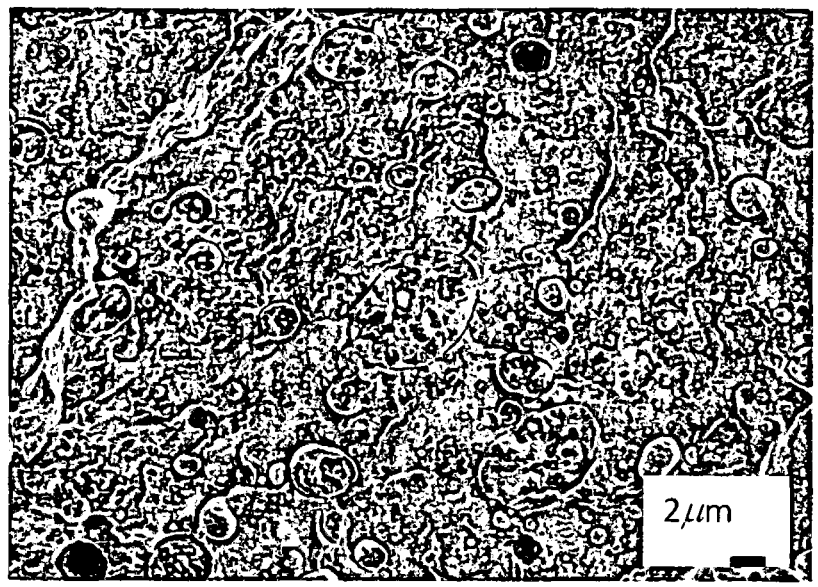
FIG. 9 is a field-emission scanning electron microscope (FE-SEM) photograph of a Comparative Example 5 test specimen for physical property measurements.

A resin mixture was obtained in the same manner as in Example 2 except that the mass ratio of PA6 and m-EBR (the mass of PA6:the mass of m-EBR) was 25:10. Then, a resin composition (thermoplastic resin composition) in a pellet form and test specimens for physical property measurement were obtained in the same manner as in Example 2 except that the mass ratio of the obtained resin mixture and PP (the mass of the resin mixture:the mass of PP) was 35:65. The obtained test specimens for physical property measurement were used to measure the Charpy impact strength and to measure the flexural modulus. Table 3 shows the obtained results and the proportion in the resin composition. In addition, the test specimen for physical property measurement subjected to the Charpy impact strength measurement was used to observe the morphology. FIG. 9 shows a field-emission scanning electron microscope (FE-SEM) photograph of the test specimen for physical property measurement. The structure of the obtained resin composition was a structure having a continuous phase formed of PP, a dispersed domain formed of PA6 distributed in the continuous phase, and a finely dispersed subdomain formed of m-EBR distributed in the dispersed domain (salami structure).

Comparative Example 6

Figure 10:
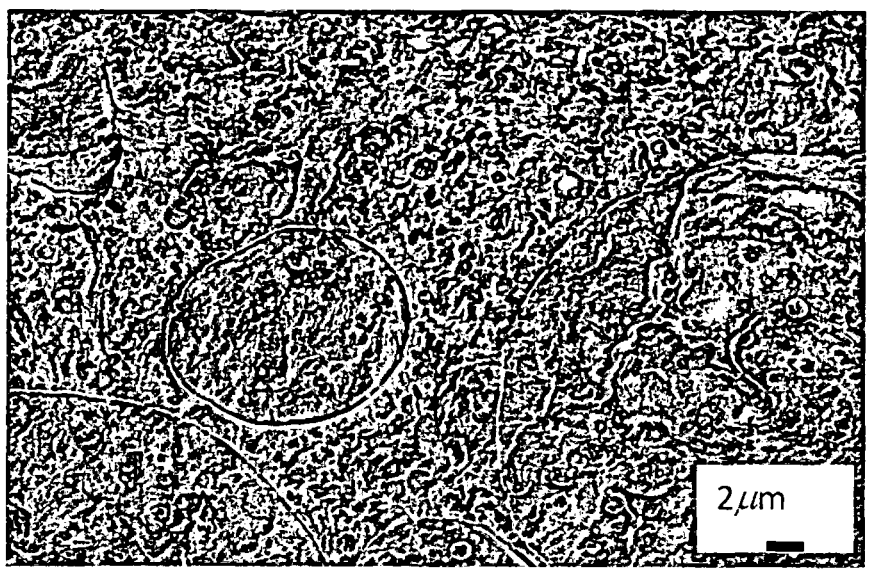
FIG. 10 is a field-emission scanning electron microscope (FE-SEM) photograph of a Comparative Example 6 test specimen for physical property measurements.

A resin mixture was obtained in the same manner as in Example 2 except that the mass ratio of PA6 and m-EBR (the mass of PA6:the mass of m-EBR) was 45:10. Then, a resin composition (thermoplastic resin composition) in a pellet form and test specimens for physical property measurement were obtained in the same manner as in Example 2 except that the mass ratio of the obtained resin mixture and PP (the mass of the resin mixture:the mass of PP) was 55:45. The obtained test specimens for physical property measurement were used to measure the Charpy impact strength and to measure the flexural modulus. Table 3 shows the obtained results and the proportion in the resin composition. In addition, the test specimen for physical property measurement subjected to the Charpy impact strength measurement was used to observe the morphology. FIG. 10 shows a field-emission scanning electron microscope (FE-SEM) photograph of the test specimen for physical property measurement. The structure of the obtained resin composition was a structure having a dispersed domain formed of PA6 or m-EBR in a continuous phase formed of PP (phase-inverted sea-island structure).

Comparative Example 7

First, PA6 and PP were mixed together by dry blending in a manner that the mass ratio (the mass of PA6:the mass of PP) was 39:61. Then, the mixture was heated and melt-kneaded under the same conditions as in Example 2 to obtain a melt-kneaded product. A resin composition (thermoplastic resin composition) in a pellet form and test specimens for physical property measurement were obtained in the same manner as in Example 2 except that such a melt-kneaded product was used. The obtained test specimens for physical property measurement were used to measure the Charpy impact strength and to measure the flexural modulus. Table 3 shows the obtained results and the proportion in the resin composition.

TABLE 3

| | | Example 2 | Comparative Example 5 | Comparative Example 6 | Comparative Example 7 |
|---|---|---|---|---|---|
| proportion [parts by mass] | PA6 | 35 | 25 | 45 | 39 |
| | m-EBR | 10 | 10 | 10 | — |
| | PP | 55 | 65 | 45 | 61 |
| physical properties | Charpy impact strength [kJ/m$^2$] | 39 | 8 | 14 | 2.3 |
| | Flexural modulus [MPa] | 1310 | 1360 | 1140 | 2030 |

As apparent from the result shown in FIG. 1, the resin composition obtained in Example 1 was observed to have a co-continuous phase structure including a continuous phase formed of PA11 (continuous phase A-PA11, reference sign 2) and a continuous phase formed of PP (continuous phase B, reference sign 7). Further, it was observed that: a dispersed domain formed of PP (dispersed domain a-PP, reference sign 10) and a dispersed domain formed of the reaction product of PA11 and m-EBR (dispersed domain a-PA11 reaction product, reference sign 4) were distributed in the continuous phase A-PA11; and a finely dispersed subdomain formed of PA11 (finely dispersed subdomain a'-PA11, reference sign 1) and a finely dispersed subdomain formed of the reaction product of PA11 and m-EBR (finely dispersed subdomain a'-PA11 reaction product, reference sign 6) were distributed in the dispersed domain a-PP. Moreover, it was observed that: a dispersed domain formed of PA11 (dispersed domain b-PA11, reference sign 3) and a dispersed domain formed of the reaction product of PA11 and m-EBR (dispersed domain b-PA11 reaction product, reference sign 5) were distributed in the continuous phase B; and a finely dispersed subdomain formed of PP (finely dispersed subdomain b'-PP, reference sign 9) and a finely dispersed subdomain formed of m-EBR (finely dispersed subdomain b'-mEBR, reference sign 8) were distributed in the dispersed domain b-PA11 reaction product. Furthermore, as apparent from the result shown in Table 1, it was verified that the resin composition having such a structure of the present invention had excellent rigidity and also had significantly excellent impact strength.

In addition, as apparent from the result shown in FIGS. 6 and 7, the resin composition obtained in Example 2 was observed to have a co-continuous phase structure including a continuous phase formed of PA6 (continuous phase A-PA6, reference sign 11) and a continuous phase formed of PP (continuous phase B, reference sign 7). Further, it was observed that a dispersed domain formed of m-EBR (dispersed domain a-mEBR, reference sign 12) was distributed in the continuous phase A-PA6; and a dispersed domain formed of PA6 (dispersed domain b-PA6, reference sign 13) was distributed in the continuous phase B; and a finely dispersed subdomain formed of m-EBR (finely dispersed subdomain b'-mEBR, reference sign 8) was distributed in the dispersed domain b-PA6.

Moreover, as apparent from the result shown in FIG. 8, the resin composition obtained in Example 2 was observed to also have a dispersed domain formed of PP (dispersed domain a-PP, reference sign 10) and a dispersed domain formed of the reaction product of PA6 and m-EBR (dispersed domain a-PA6 reaction product, reference sign 17), which were distributed in the continuous phase A-PA6 (reference sign 11), and a finely dispersed subdomain formed of m-EBR (finely dispersed subdomain a'-mEBR, reference sign 15), a finely dispersed subdomain formed of PA6 (finely dispersed subdomain a'-PA6, reference sign 14) and a finely dispersed subdomain formed of the reaction product of PA6 and m-EBR (finely dispersed subdomain a'-PA6 reaction product, reference sign 18), which were distributed in the dispersed domain a-PP. Furthermore, it was also observed that a dispersed domain formed of the reaction product of PA6 and m-EBR (dispersed domain b-PA6 reaction product, reference sign 16) and a dispersed domain formed of m-EBR were distributed in the continuous phase B; and the finely dispersed subdomain b'-mEBR (reference sign 8) and the finely dispersed subdomain b'-PP (reference sign 9) were distributed in the dispersed domain b-PA6 reaction product. Additionally, as apparent from the result shown in Table 3, it was verified that the resin composition having such a structure of the present invention had excellent rigidity and also had significantly excellent impact strength.

INDUSTRIAL APPLICABILITY

As has been described above, the present invention makes it possible to provide a resin composition having excellent impact strength and also having excellent rigidity.

REFERENCE SIGNS LIST

1: finely dispersed subdomain a'-PA11
2: continuous phase A-PA11
3: dispersed domain b-PA11
4: dispersed domain a-PA11 reaction product
5: dispersed domain b-PA11 reaction product
6: finely dispersed subdomain a'-PA11 reaction product
7: continuous phase B
8: finely dispersed subdomain b'-mEBR
9: finely dispersed subdomain b'-PP
10: dispersed domain a-PP
11: continuous phase A-PA6
12: dispersed domain a-mEBR
13: dispersed domain b-PA6
14: finely dispersed subdomain a'-PA6
15: finely dispersed subdomain a'-mEBR
16: dispersed domain b-PA6 reaction product
17: dispersed domain a-PA6 reaction product
18: finely dispersed subdomain a'-PA6 reaction product.

The invention claimed is:

1. A resin composition comprising a blend of a first resin, a second resin incompatible with the first resin, a modified elastomer having a reactive group capable of reacting with the first resin, and a reaction product of the first resin and the modified elastomer, wherein the resin composition has a co-continuous phase structure including a continuous phase A formed of the first resin and a continuous phase B formed of the second resin, and also has a dispersed domain a distributed in the continuous phase A, a finely dispersed subdomain a' distributed in the dispersed domain a, a dispersed domain b distributed in the continuous phase B, and a finely dispersed subdomain b' distributed in the dispersed domain b, the dispersed domain a includes a dispersed domain formed of at least one selected from the group consisting of the second resin and the reaction product of the first resin and the modified elastomer, the dispersed domain b includes a dispersed domain formed of at least one selected from the group consisting of the first resin and the reaction product of the first resin and the modified elastomer, when the dispersed domain a is formed of the second resin, the finely dispersed subdomain a' is a finely dispersed subdomain formed of at least one selected from the group consisting of the first resin, the modified elastomer, and the reaction product of the first resin and the modified elastomer, when the dispersed domain a is formed of the reaction product of the first resin and the modified elastomer, the finely dispersed subdomain a' is a finely dispersed subdomain formed of at least one selected from the group consisting of the first resin, the second resin, and the modified elastomer, when the dispersed domain b is formed of the first resin, the finely dispersed subdomain b' is a finely dispersed subdomain formed of at least one selected from the group consisting of the second resin, the modified elastomer, and the reaction product of the first resin and the modified elastomer, and when the dispersed domain b is formed of the reaction product of the first resin and the modified elastomer, the finely dispersed subdomain b' is a finely dispersed subdomain formed of at least one selected from the group consisting of the first resin, the second resin, and the modified elastomer, and wherein each of the first resin, the second resin, the modified elastomer and the reaction product of the first resin and the modified elastomer is present in at least one of the continuous phases A and B, the dispersed domains a and b and the finely dispersed subdomains a' and b'.

2. The resin composition according to claim 1, wherein the first resin is a polyamide resin.

3. The resin composition according to claim 1, wherein the second resin is a polyolefin resin.

4. The resin composition according to claim 1, wherein
the dispersed domain a includes a dispersed domain formed of the second resin and a dispersed domain formed of the reaction product of the first resin and the modified elastomer,
the dispersed domain b includes a dispersed domain formed of the reaction product of the first resin and the modified elastomer,
the finely dispersed subdomain a' in the dispersed domain a formed of the second resin is a finely dispersed subdomain formed of the reaction product of the first resin and the modified elastomer, and
the finely dispersed subdomain b' in the dispersed domain b formed of the reaction product of the first resin and the modified elastomer is a finely dispersed subdomain formed of the modified elastomer.

5. The resin composition according to claim 1, which further has a dispersed domain formed of the modified elastomer in at least one continuous phase selected from the group consisting of the continuous phase A and the continuous phase B.

6. The resin composition according to claim 5, which further has a finely dispersed subdomain in the dispersed domain formed of the modified elastomer, the finely dispersed subdomain formed of at least one selected from the group consisting of the first resin, the second resin, and the reaction product of the first resin and the modified elastomer.

7. The resin composition according to claim 1, wherein the modified elastomer is at least one of an olefin-based thermoplastic elastomer and a styrene-based thermoplastic elastomer, modified to include a group selected from the group consisting of an acid anhydride group, a carboxyl group, an epoxy group, an oxazoline group and an isocyanate group as the reactive group capable of reacting with the first resin.

* * * * *